United States Patent [19]

Shinohara et al.

[11] Patent Number: 5,311,379
[45] Date of Patent: May 10, 1994

[54] METHOD AND SYSTEM FOR POSITIONING HEAD ON TARGET CYLINDER OF DISK

[75] Inventors: Tohru Shinohara; Shuichi Hashimoto, both of Kawasaki, Japan

[73] Assignee: Fujitsu Limited, Kawasaki, Japan

[21] Appl. No.: 766,399

[22] Filed: Sep. 27, 1991

[30] Foreign Application Priority Data

Dec. 25, 1990 [JP] Japan .................................. 2-414430

[51] Int. Cl.⁵ .............................................. G11B 5/596
[52] U.S. Cl. ............................ 360/77.02; 360/77.05; 360/77.08
[58] Field of Search ............... 360/77.04, 77.05, 77.06, 360/77.07, 77.08, 77.02

[56] References Cited

U.S. PATENT DOCUMENTS

| | | | |
|---|---|---|---|
| 4,499,511 | 2/1985 | Sugaya | 360/78.06 |
| 4,539,607 | 9/1985 | Fujiki | 360/77.02 |
| 4,638,384 | 1/1987 | Stewart et al. | 360/77.05 |
| 5,079,654 | 1/1992 | Uno et al. | 360/77.08 |

FOREIGN PATENT DOCUMENTS

3-91171 4/1991 Japan .

OTHER PUBLICATIONS

Patent Abstracts of Japan, vol. 6, No. 8 (P-98) Jan. 19, 1982 & JP-A-56 134362 (Toshiba Corp.) Oct. 21, 1981.
Patent Abstracts of Japan, vol. 6, No. 248 (P-160) Dec. 7, 1982 & JP-A-57 143770 (Hitachi Corp.) Aug. 6, 1982.
Patent Abstracts of Japan, vol. 11, No. 173 (P-582) Jun. 4, 1987 & JP-A-62 003473 (Toshiba Corp.) Jan. 9, 1987.
Patent Abstracts of Japan, vol. 15, No. 5 (P-1149) Jan. 8, 1991 & JP-A-2 253425 (NEC Corp.) Oct. 12, 1990.

*Primary Examiner*—Timothy P. Callahan
*Attorney, Agent, or Firm*—Staas & Halsey

[57] ABSTRACT

A method of positioning a magnetic head on a target cylinder of a magnetic disk uses a position signal derived from a servo signal which is read from a magnetic disk using a magnetic head. The servo signal includes at least first and second servo signal components on even cylinders of the magnetic disk and includes at least third and fourth servo signal components on odd cylinders of the magnetic disk. The position signal is used for moving the magnetic head to a desired cylinder. The method comprises the steps of obtaining a first position signal for positioning the magnetic head to an odd cylinder on the magnetic disk based on a difference between peak values of the first and second servo signal components, obtaining a second position signal for positioning the magnetic head to an even cylinder on the magnetic disk based on a difference between peak values of the third and fourth servo signal components, and using only one of the first and second position signals to position the magnetic head to the target cylinder depending on a cylinder address of the target cylinder.

9 Claims, 15 Drawing Sheets

FIG. 2A

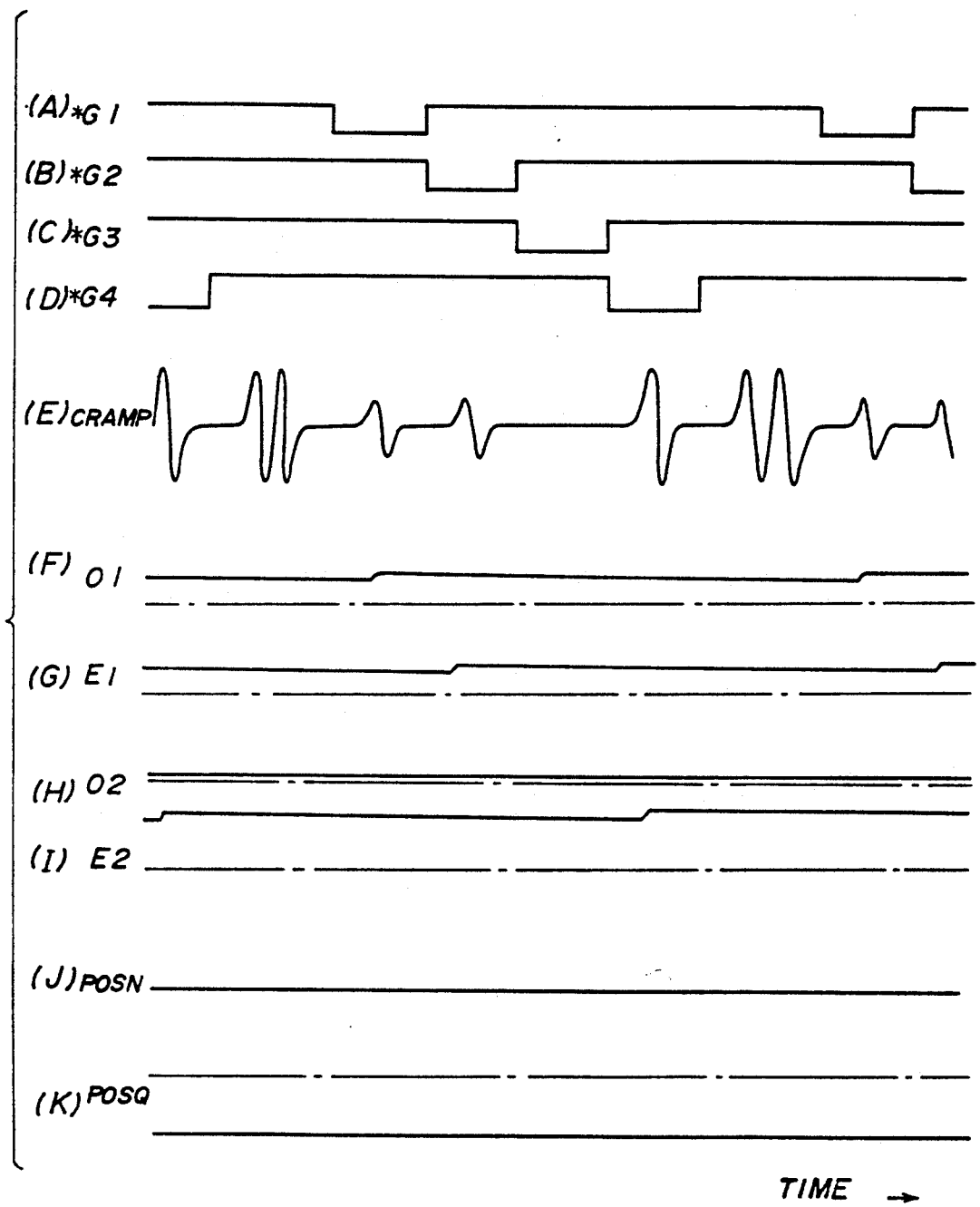

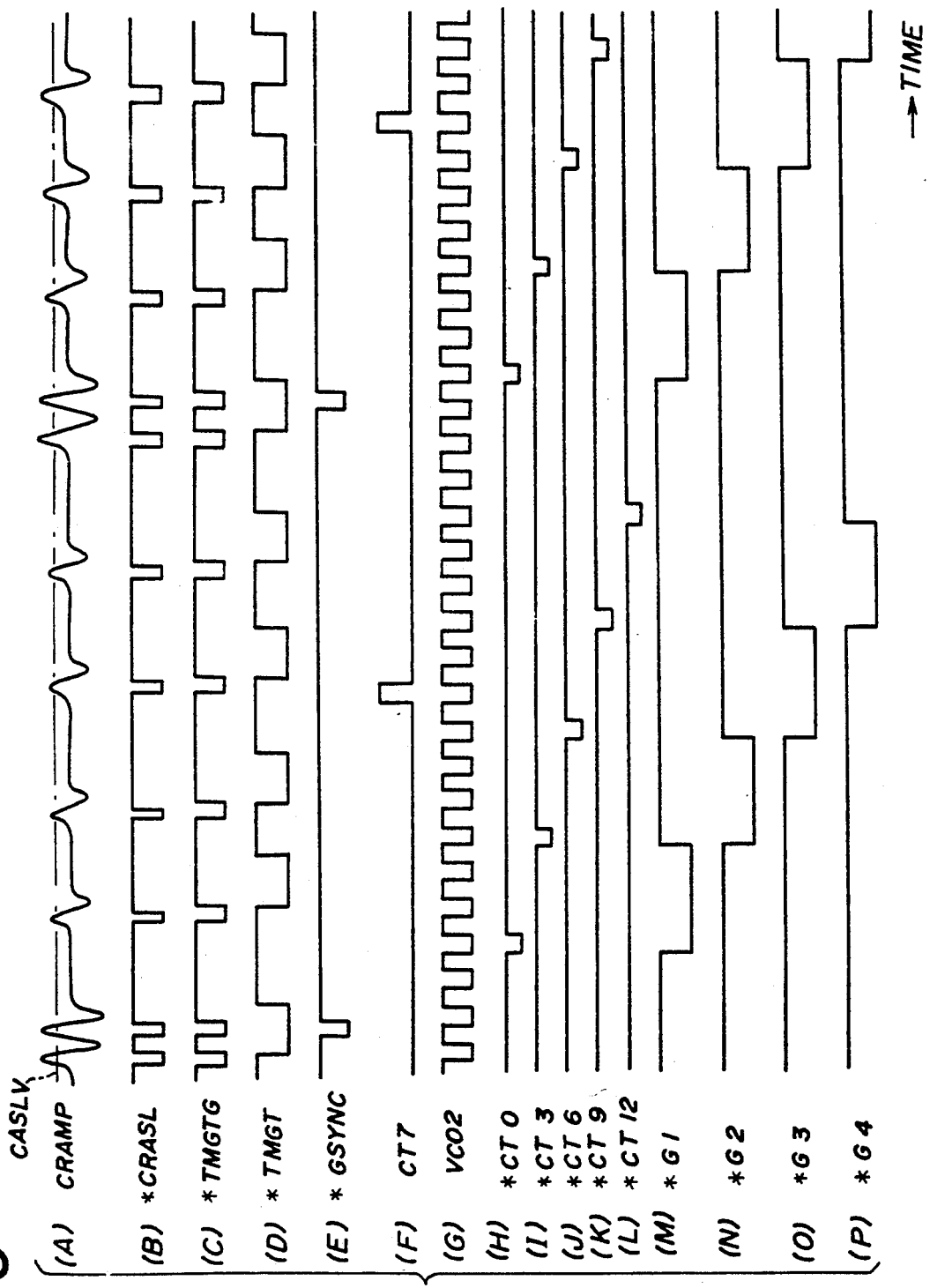

METHOD AND SYSTEM FOR POSITIONING HEAD ON TARGET CYLINDER OF DISK

BACKGROUND OF THE INVENTION

The present invention generally relates to methods and systems for positioning a magnetic head, and more particularly to a method and a system for positioning a magnetic head on a target cylinder of a magnetic disk based on a servo signal which is read by the magnetic head in a magnetic disk unit.

FIG. 1 shows an essential part of a head position control part of a conventional magnetic disk unit. In FIG. 1, when a control circuit 71 receives a seek instruction, a servo signal which is read from a magnetic disk 72 by a magnetic head 73 is amplified by a servo amplifier 74. The magnetic disk 72 is one of a plurality of magnetic disks (not shown) which form a magnetic disk pack. A servo signal CRAMP from the servo amplifier 74 is supplied to a position signal demodulating circuit 75 and a synchronizing signal demodulating circuit 76. The position signal demodulating circuit 75 is made up of peak hold circuits and position signal amplifiers as will be described later in conjunction with FIG. 3, and generates position signals POSN and POSQ for servo control. The position signals POSN and POSQ are supplied to a servo circuit 77.

The servo circuit 77 generates a driving signal DS based on the position signals POSN and POSQ and target position information which is specified by the control circuit 71. This driving signal DS is supplied to a voice coil motor 78 which moves the magnetic head 73.

On the other hand, the synchronizing signal demodulating circuit 76 generates a synchronizing pulse *GSYNC1 and supplies this synchronizing pulse *GSYNC1 to a phase locked loop (PLL) counter 79. The PLL counter 79 generates gate signals PL01 and *G1 through *G4 in synchronism with the synchronizing pulse *GSYNC1, where "*" indicates a low-active signal.

During a seek operation, the position control of the magnetic head 73 is carried out using the position signal POSN for even cylinders and using the position signal POSQ for odd cylinders of the magnetic disk 72. Hence, the position signals POSN and POSQ are alternately used during the seek operation, and a velocity control is carried out by detecting the moving velocity of the magnetic head 73.

Next, a description will be given of the manner in which the servo signal is recorded on the magnetic disk 72, and the servo signal which is read from the magnetic disk 72 in a state where the magnetic head 73 is positioned on a servo track, by referring to FIGS. 2A and 2B.

In FIG. 2A, a synchronizing signal region 80 and first through fourth servo signal component regions 81 through 84 are successively formed in a longitudinal direction of servo tracks of each cylinder. A magnetizing direction reversing region having ½ the track width is formed in the first and second servo signal component regions 81 and 82 of the servo tracks of even cylinders n and n+2, and in the third and fourth servo signal component regions 83 and 84 of the servo tracks of odd cylinders n+1 and n+3. Accordingly, the servo signal shown in FIG. 2B is read by the magnetic head 73 in a state where the magnetic head 73 is positioned on the servo track.

In the servo tracks of the even cylinders n and n+2, the first and second servo signal components (i) and (ii) are the same. Similarly, in the servo tracks of the odd cylinders n+1 and n+3, the third and fourth servo signal components (iii) and (iv) are the same. In addition, the above relationships no longer stands if the magnetic head 73 deviates from the center of the servo track. For example, if the magnetic head 73 on the servo track of the cylinder n+2 deviates towards the cylinder n+1, the first servo signal component (i) becomes larger than the second servo signal component (ii). Accordingly, a level difference between a peak value of the first servo signal component (i) and a peak value of the second servo signal component (ii) is obtained and used as the position signal POSN for the even cylinder. On the other hand, a level difference between a peak value of the third servo signal component (iii) and a peak value of the fourth servo signal component (iv) is obtained and used as the position signal POSQ for the odd cylinder.

FIG. 3 shows the structure of the position signal demodulating circuit 75. The servo signal CRAMP including the first through fourth servo signal components (i) through (iv) is input to each of peak hold circuits 91 through 94. The peak hold circuits 91 through 94 respectively receive the gate signals *G1 through *G4 from the PLL counter 79 shown in FIG. 1. The gate signals *G1 through *G4 respectively correspond to the first through fourth servo signal components which are obtained from the synchronizing signal component in the PLL counter 79. Hence, the peak hold circuits 91 through 94 hold peak values of the first through fourth servo signal components (i) through (iv), respectively, in response to the gate signals *G1 through *G4.

Output signals of the peak hold circuits 91 and 92 are supplied to a differential amplifier 95, and output signals of the peak hold circuits 93 and 94 are supplied to a differential amplifier 96. The differential amplifier 95 outputs the position signal POSN for the even cylinder based on the difference of the signals (peak values) received from the peak hold circuits 91 and 92. Similarly, the differential amplifier 96 outputs the position signal POSQ for the odd cylinder based on the difference of the signals (peak values) received from the peak hold circuits 93 and 94. The position signals POSN and POSQ from the differential amplifiers 95 and 96 are supplied to a position signal selection circuit 97. The position signal selection circuit 97 selectively outputs one of the position signals POSN and POSQ in response to a selection signal which indicates whether the target cylinder is an even or odd cylinder. For example, the position signal POSN is selectively output from the position signal selection circuit 97 when the selection signal indicates that the target cylinder is an even cylinder. The position signal POSN or POSQ output from the position signal selection circuit 97 is supplied to the servo circuit 77 shown in FIG. 1 and used for controlling the position of the magnetic head 73.

However, according to the conventional position signal demodulating circuit 75, the peak hold circuits 91 and 92 which are used for generating the position signal POSN for the even cylinder and the peak hold circuits 93 and 94 which are used for generating the position signal POSQ for the odd cylinder are independent circuits. For this reason, because there are inevitable differences in the peak value detection sensitivities of the peak hold circuits 91 and 92 and the peak hold circuits 93 and 94, the signal levels of the position signals POSN and POSQ become different with respect to the same positional error. In other words, the positioning accuracy for the even cylinder and the positioning accuracy for the odd cylinder become different, and there is a problem in that it is difficult to carry out a stable head position control for all of the cylinders.

FIG. 4 shows a seek locus of the magnetic head 73 for a case where the peak hold circuits 93 and 94 which are used for generating the position signal POSQ have a certain offset. In this case, the electrical center of the cylinder shifts as indicated by a dotted line from the actual center of the cylinder on the magnetic disk 72 due to the difference in the peak value detection sensitivities of the peak hold circuits 93 and 94 when compared to those of the peak hold circuits 91 and 92, where the actual center of the cylinder is indicated by a solid line. In other words, when a seek operation is made from the cylinder n to the cylinder n-1, an undershoot occurs as shown. On the other hand, an overshoot occurs as shown when a seek operation is made from the cylinder n to the cylinder n+1.

SUMMARY OF THE INVENTION

Accordingly, it is a general object of the present invention to provide a novel and useful method and system for positioning a head to a target cylinder of a disk, in which the problems described above are eliminated.

Another and more specific object of the present invention is to provide a method of positioning a magnetic head on a target cylinder of a magnetic disk using a position signal derived from a servo signal which is read from a magnetic disk using a magnetic head, where the servo signal includes at least first and second servo signal components on even cylinders of the magnetic disk and includes at least third and fourth servo signal components on odd cylinders of the magnetic disk, the position signal is used for moving the magnetic head to a desired cylinder, and the method comprises the steps of obtaining a first position signal for positioning the magnetic head to an odd cylinder on the magnetic disk based on a difference between peak values of the first and second servo signal components, obtaining a second position signal for positioning the magnetic head to an even cylinder on the magnetic disk based on a difference between peak values of the third and fourth servo signal components, and using only one of the first and second position signals to position the magnetic head to the target cylinder depending on a cylinder address of the target cylinder. According to the method of the present invention, it is possible to use in common the peak hold circuits which are used to generate the first position signal and the peak hold circuits which are used to generate the second position signal. Hence, the magnetic head can be positioned to the target cylinder with the same precision, regardless of whether the target cylinder is an odd or even cylinder. Therefore, the seek operation is stabilized according to the present invention.

Still another object of the present invention is to provide a head positioning system for positioning a magnetic head on a target cylinder of a magnetic disk using a position signal derived from a servo signal which is read from a magnetic disk using a magnetic head, where the servo signal includes at least first and second servo signal components on even cylinders of the magnetic disk and includes at least third and fourth servo signal components on odd cylinders of the magnetic disk, and the position signal is used for moving the magnetic head to a desired cylinder. The head positioning system comprises position signal generating means, including peak hold circuits, for obtaining a first position signal which is used for positioning the magnetic head to an odd cylinder on the magnetic disk based on a difference between peak values of the first and second servo signal components and for obtaining a second position signal which is used for positioning the magnetic head to an even cylinder on the magnetic disk based on a difference between peak values of the third and fourth servo signal components, and servo means which uses only one of the first and second position signals to position the magnetic head to the target cylinder depending on a cylinder address of the target cylinder. According to the head positioning system of the present invention, it is possible to use in common the peak hold circuits which are used to generate the first position signal and the peak hold circuits which are used to generate the second position signal. Hence, the magnetic head can be positioned to the target cylinder with the same precision, regardless of whether the target cylinder is an odd or even cylinder. Therefore, the seek operation is stabilized according to the present invention.

Other objects and further features of the present invention will be apparent from the following detailed description when read in conjunction with the accompanying drawings.

BRIEF DESCRIPTION OF THE DRAWINGS

Figure 2A:
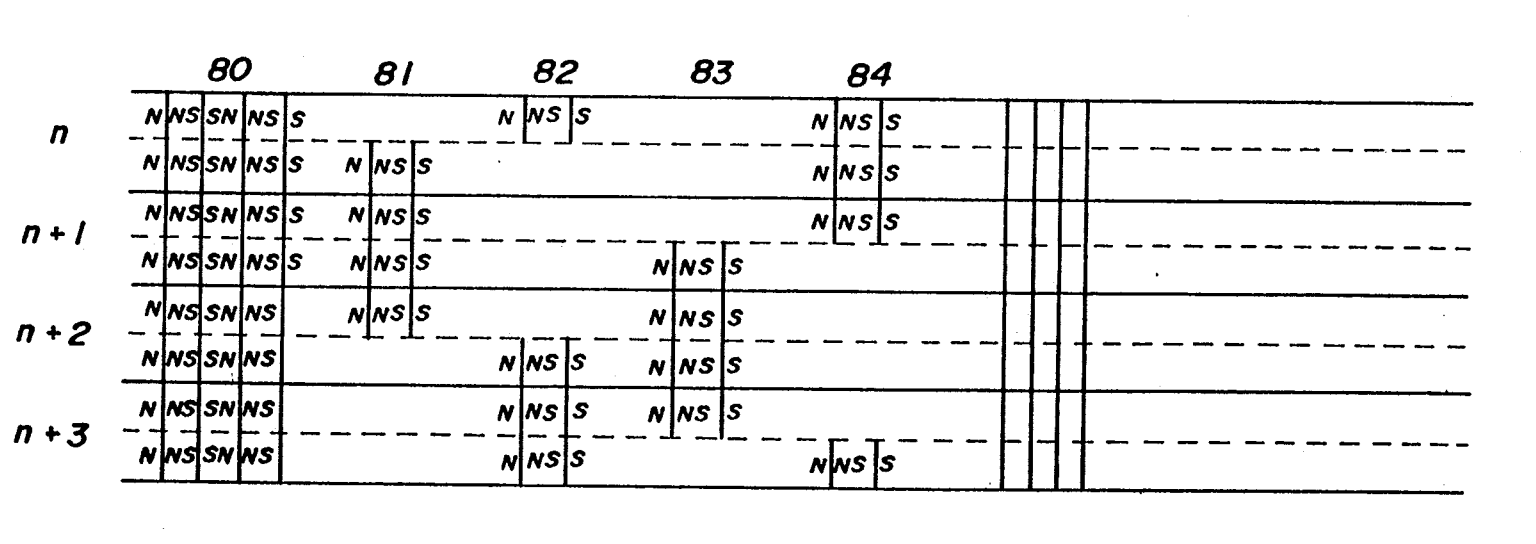

FIGS. 2A and 2B are diagrams for explaining a servo signal which is read from a magnetic disk by a magnetic head;

FIG. 10 is a time chart for explaining an operation of the position signal demodulating circuit shown in FIG. 9;

FIG. 16 is a time chart for explaining an operation of the system block shown in FIG. 15.

DESCRIPTION OF THE PREFERRED EMBODIMENTS

First, a description will be given of an operating principle of the present invention, by referring to FIG. 5.

Figure 5:
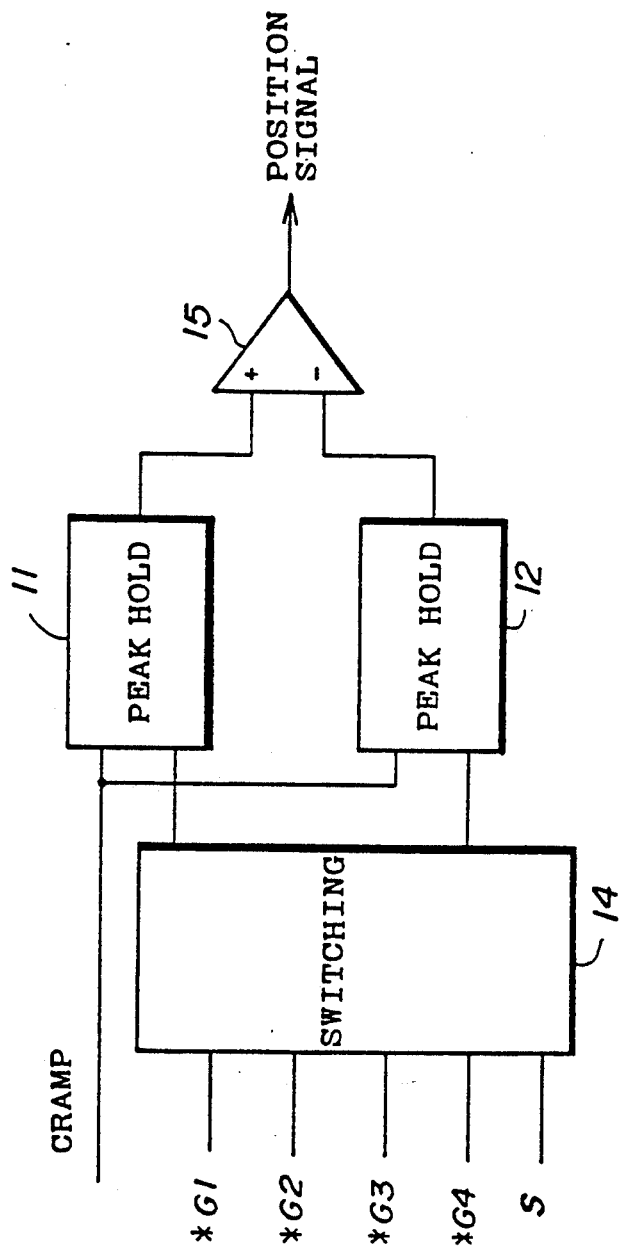
FIG. 5 is a system block diagram for explaining an operating principle of the present invention.

In FIG. 5, a servo signal CRAMP is supplied to peak hold circuits 11 and 12. Gate signals *G1 and *G3 are supplied to the peak hold circuit 11 via a switching circuit 14, while gate signals *G2 and *G4 are supplied to the peak hold circuit 12 via the switching circuit 14. The switching circuit 14 switches the gate signals *G1 and *G3 in response to a switching signal S, and also switches the gate signals *G2 and *G4 in response to the switching signal S. A differential amplifier 15 obtains a difference of output signals of the peak hold circuits 11 and 12, and outputs a position signal which corresponds to an even or odd cylinder.

The procedure for generating the position signal POSN for the even cylinder and the position signal POSQ for the odd cylinder are basically the same as that used in the conventional circuit described above. However, because the present invention uses the switching circuit 14, the same peak hold circuits 11 and 12 can be used in common when generating the position signal POSN for the even cylinder and when generating the position signal POSQ for the odd cylinder. In other words, by supplying the switching signal S to the switching circuit 14, selecting one of the gate signals *G1 and *G3 in the switching circuit 14, and selecting one of the gate signals *G2 and *G4 in the switching circuit 14, it is possible to generate the position signals corresponding to each of the cylinders. Accordingly, the position signals POSN and POSQ for the even and odd cylinders can be made uniform with respect to the same positional error. As a result, only one of the position signals for the odd and even cylinders is used for the positioning of the magnetic head depending on the cylinder address of the target cylinder.

Figure 1:
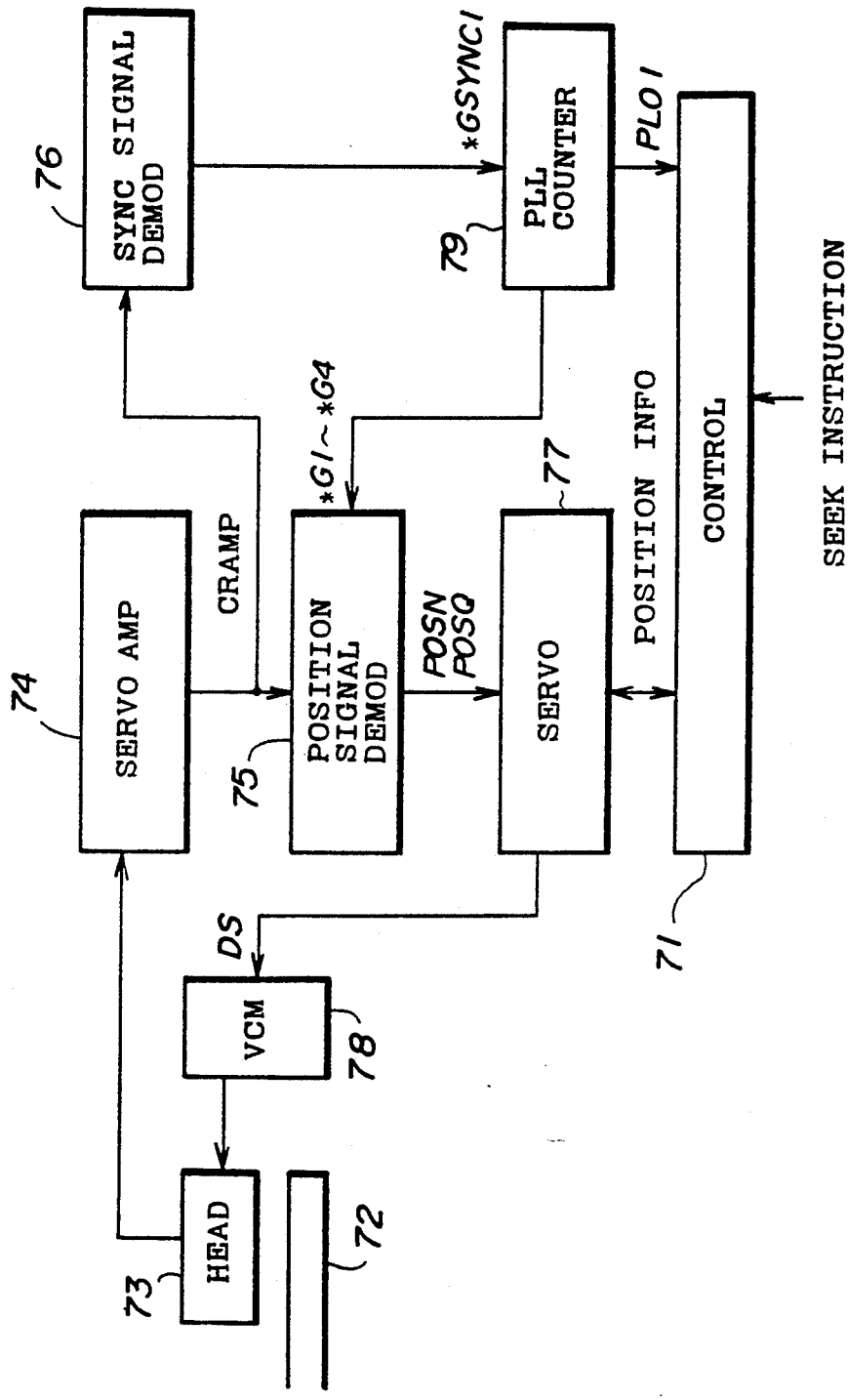
FIG. 1 is a system block diagram showing an essential part of a head position control part of a conventional magnetic disk unit.
Figure 2B:
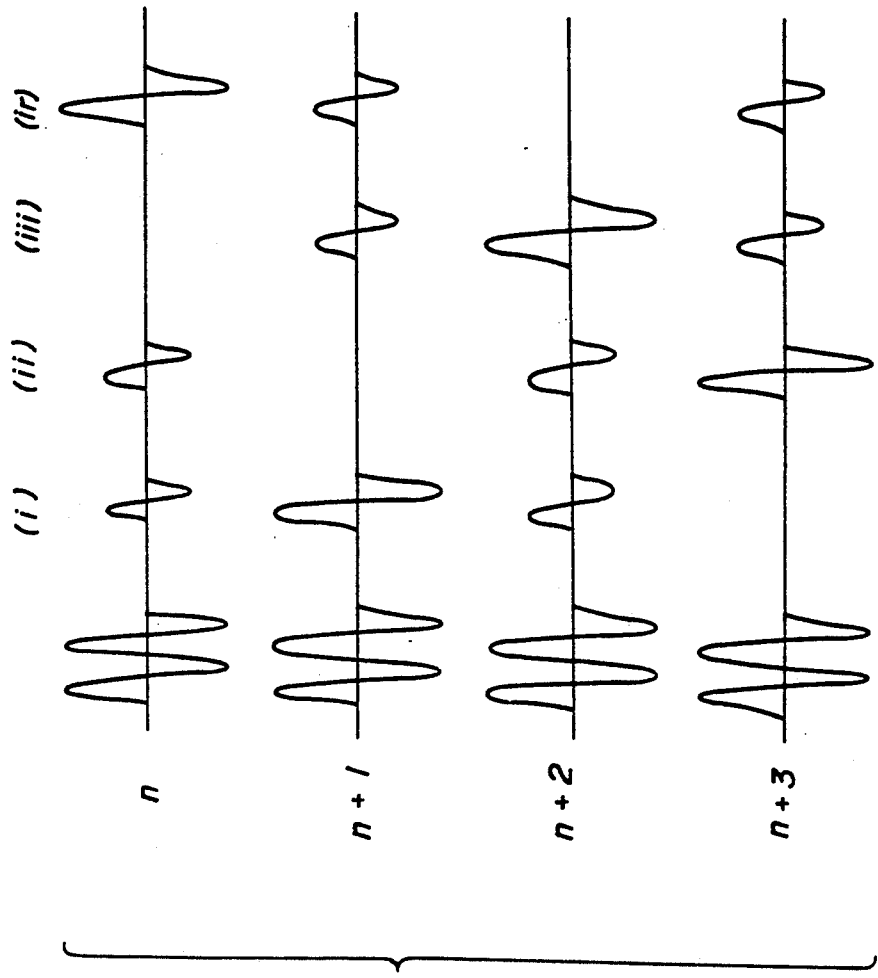
Figure 6:
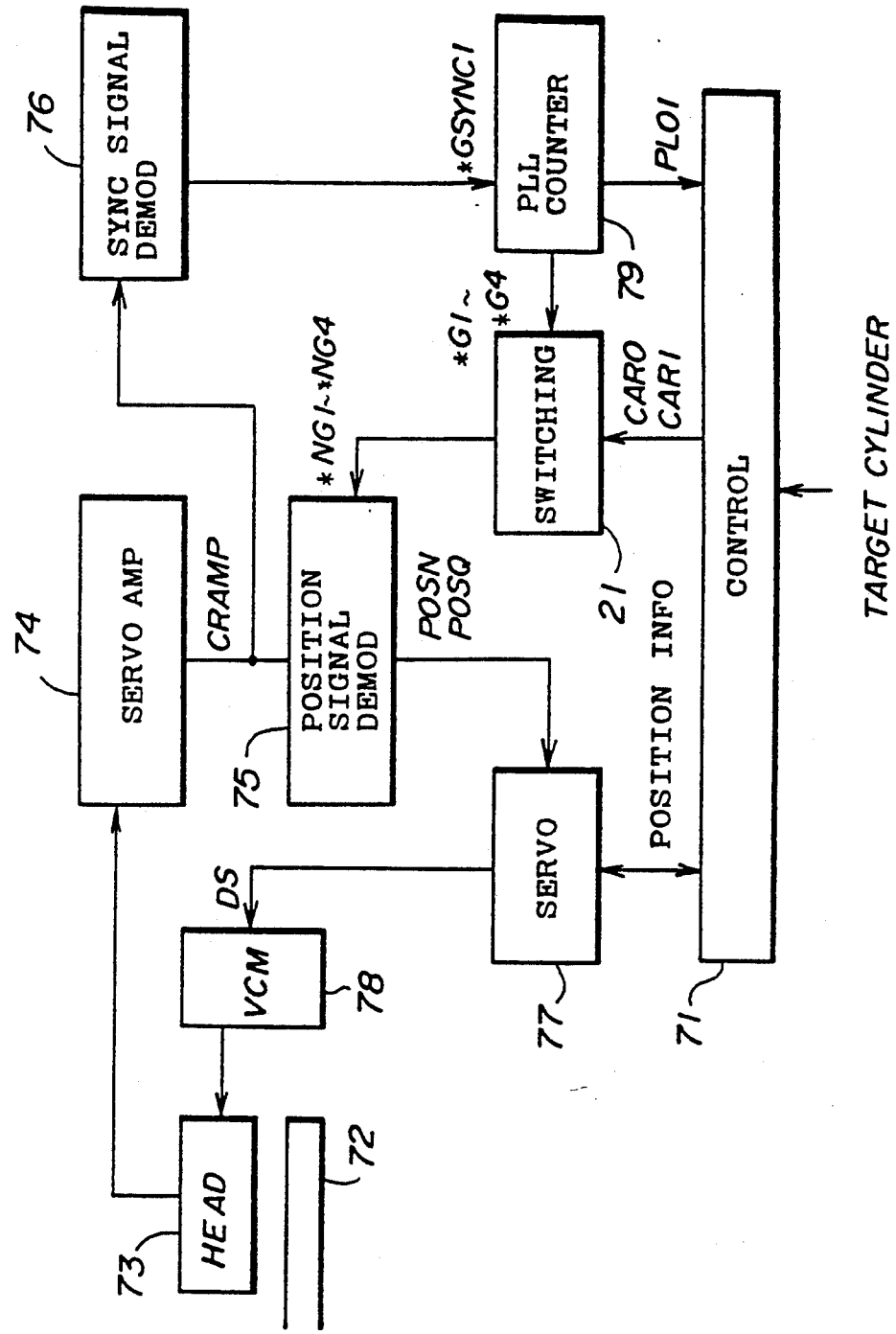
FIG. 6 is a system block diagram showing an embodiment of a head positioning system according to the present invention applied to a magnetic disk unit.

Next, a description will be given of an embodiment of a head positioning system according to the present invention, by referring to FIG. 6. FIG. 6 shows an essential part of a head position control part of a magnetic disk unit, and in FIG. 6, those parts which are the same as those corresponding parts in FIG. 1 are designated by the same reference numerals, and a description thereof will be omitted.

According to this embodiment, the gate signals *G1 through *G4 which are output from the PLL counter 79 is supplied to a switching circuit 21. This switching circuit 21 converts the gate signals *G1 through *G4 into gate signals *NG1 through *NG4 for the peak hold, using lower cylinder addresses CAR0 and CAR1 from the control circuit 71 as switching signals. The gate signals *NG1 through *NG4 are supplied to the position signal demodulating circuit 75, so that the magnetic head 73 can be positioned on the even or odd cylinder using only one of the position signals POSN and POSQ.

Figure 7:
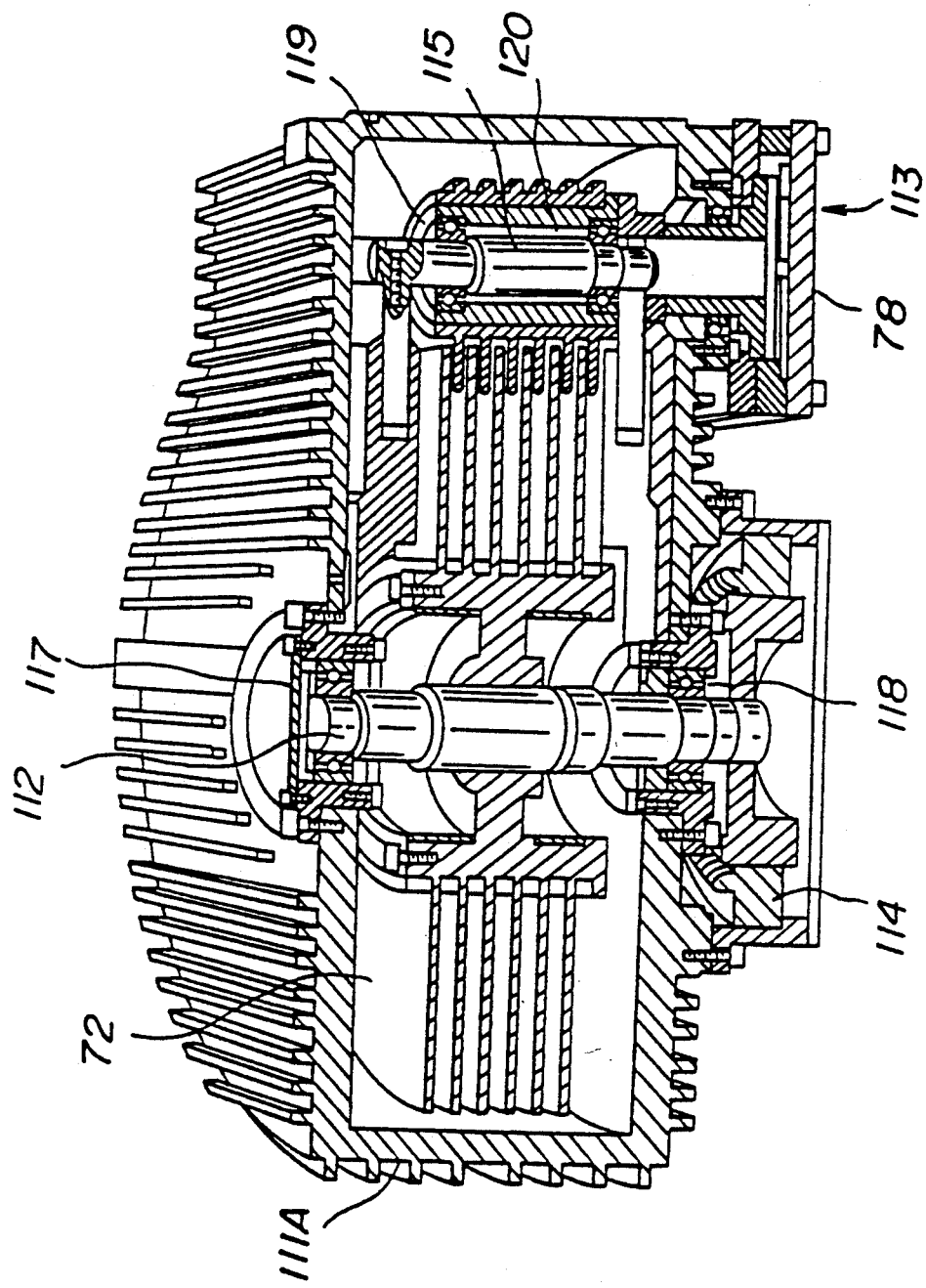
FIG. 7 is a cross sectional view showing a magnetic head and a magnetic disk shown in FIG. 6.

In FIG. 6, the magnetic disk 72 is one of a plurality of magnetic disks 72 accommodated within a shell part 111A of a housing as shown in FIG. 7. The housing supports a spindle 112 of a magnetic disk pack and a magnetic head positioner 113. In FIG. 7, six magnetic disks 72 are assembled in a stack around the spindle 112, but the number of magnetic disks may be varied depending on the memory capacity of the magnetic disk unit. The spindle 112 is supported at both ends by ball bearings 117 and 118. These bearings 117 and 118 contain a ferrofluidic seal which keeps airtight the space between the inside and outside separated by the bearing while assuring free rotation of the spindle 112.

The magnetic disks 72 are spaced with a predetermined distance between each other and are rotated by the spindle 112 which is powered by a D.C. motor 114 attached to one end of the spindle 112. The magnetic head positioner 113 has a similar structure as that of the known magnetic disk pack. The positioner 113 has arms (not completely shown) fixed to a spindle 115 which is supported by ball bearings 119 and 120. The spindle 115 is driven by the voice coil motor 78 to rotate about its axis to the left and right by a desired angle. Hence, the magnetic head 73 supported by the arms is brought to a desired position over the magnetic disk 72.

Figure 8:
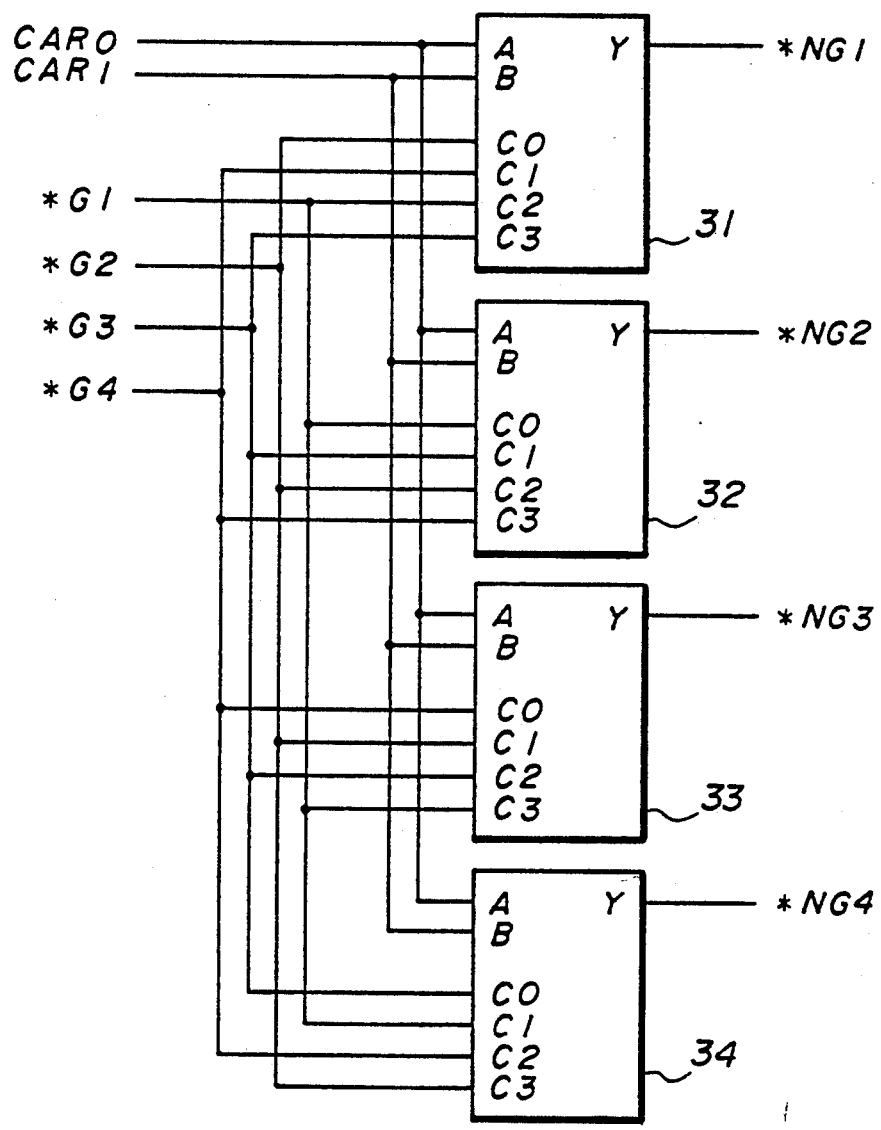
FIG. 8 is a system block diagram showing an embodiment of a switching circuit shown in FIG. 6.

FIG. 8 shows an embodiment of the switching circuit 21 shown in FIG. 6. The cylinder address CAR0 is supplied to each input terminal A of multiplexers 31 through 34, and the cylinder address CAR1 is supplied to each input terminal B of the multiplexers 31 through 34. The cylinder addresses CAR0 and CAR1 are obtained from gate switching registers (not shown) within the control circuit 71. The gate signals *G2, *G4, *G1 and *G3 are respectively supplied to input terminals C0 through C3 of the multiplexer 31. The gate signals *G1, *G3, *G2 and *G4 are respectively supplied to input terminals C0 through C3 of the multiplexer 32. The gate signals *G4, *G2, *G3 and *G1 are respectively supplied to input terminals C0 through C3 of the multiplexer 33. In addition, the gate signals *G3, *G1, *G4 and *G2 are respectively supplied to input terminals C0 through C3 of the multiplexer 34. The gate signals *NG1 through *NG4 for peak hold are respectively output from output terminals Y of the multiplexers 31 through 34.

The following Table 1 shows the relationship of the input and output signals of each of the multiplexers 31 through 34, where "L" denotes a low level ("0"), "H" denotes a high level ("1") and "X" denotes a don't care.

TABLE 1

| A | B | C0 | C1 | C2 | C3 | Y |
|---|---|-----|-----|-----|-----|-----|
| L | L | L/H | X | X | X | L/H |
| H | L | X | L/H | X | X | L/H |
| L | H | X | X | L/H | X | L/H |
| H | H | X | X | X | L/H | L/H |

In other words, if the cylinder addresses CAR0 and CAR1 are [0, 0], for example, each of the multiplexers 31 through 34 select the input from the input terminal C0. Hence, in this case, the gate signal *G1 is converted into the gate signal NG2, the gate signal *G2 is converted into the gate signal *NG1, the gate signal *G3 is converted into the gate signal *NG4, and the gate signal *G4 is converted into the gate signal *NG3.

Figure 3:
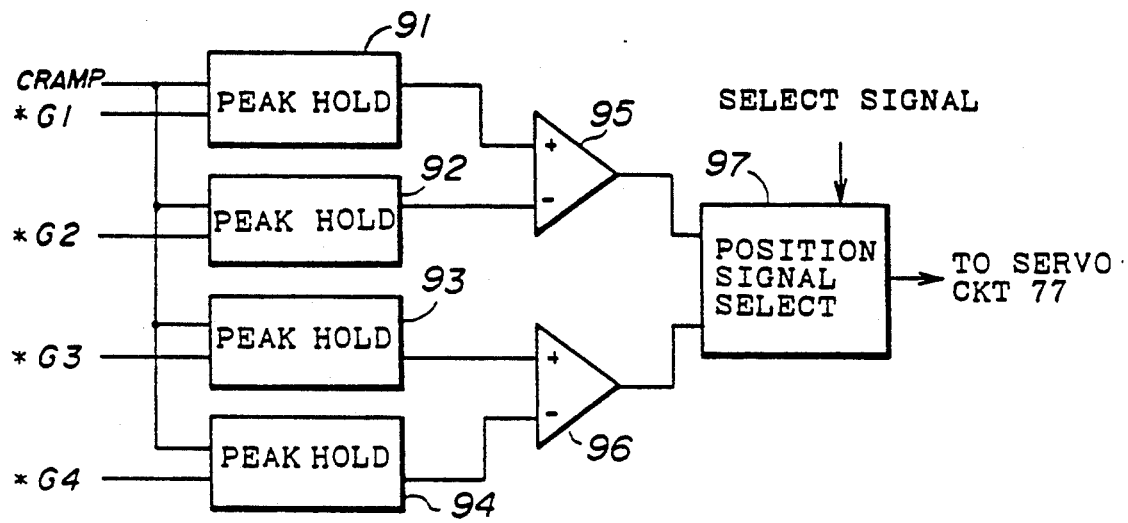
FIG. 3 is a system block diagram showing the structure of a conventional position signal demodulating circuit shown in FIG. 1.
Figure 9:
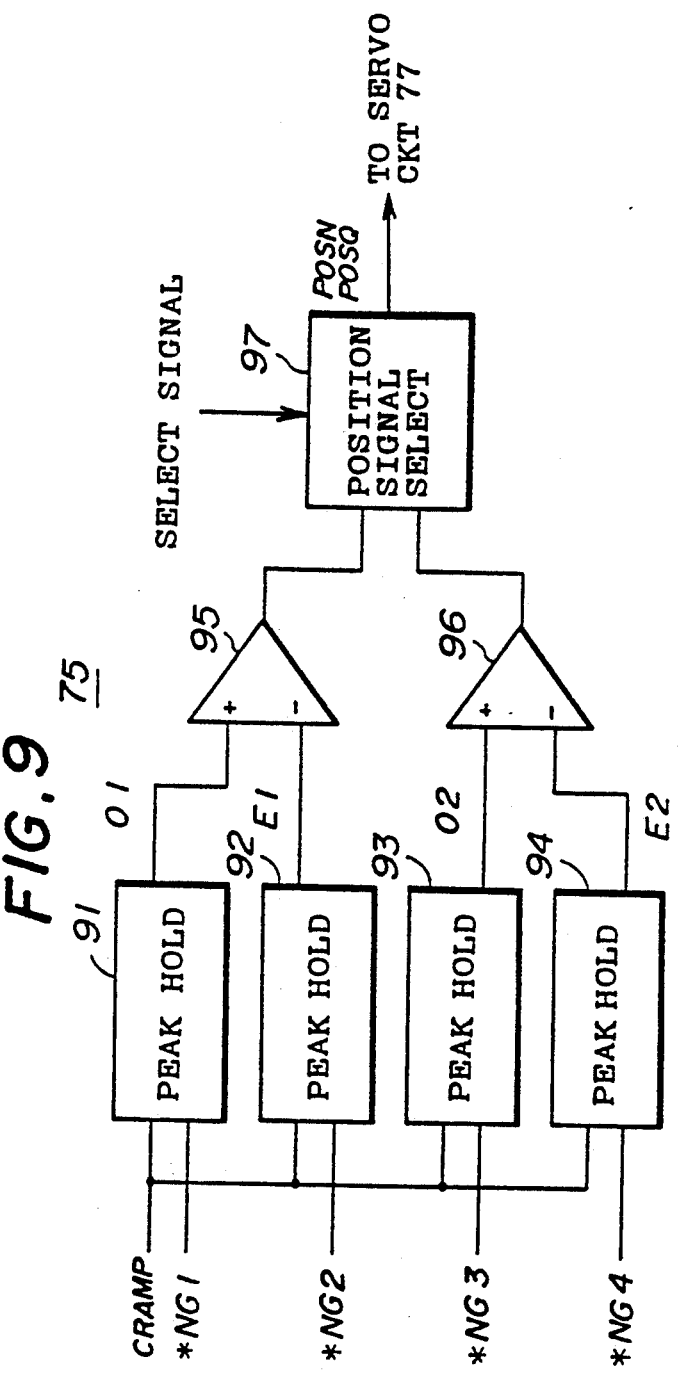
FIG. 9 is a system block diagram showing an embodiment of a position signal demodulating circuit shown in FIG. 6.

FIG. 9 shows an embodiment of the position signal demodulating circuit 75 shown in FIG. 6. In FIG. 9, those parts which are basically the same as those corresponding parts in FIG. 3 are designated by the same reference numerals, and a description thereof will be omitted.

In FIG. 9, the gate signals *NG1 through *NG4 are respectively supplied to the peak hold circuits 91 through 94. For the sake of convenience, it will be assumed that the gate signals *NG1, *NG2, *NG3 and *NG4 respectively have peak values O1, E1, O2 and E2. In this case, the relationship of the cylinder addresses CAR0 and CAR1 and the gate signals *G1 through *G4 which are obtains as the peak values O1, E1, O2 and E2 becomes as shown in the following Table 2.

TABLE 2

| CAR0 | CAR1 | O1  | E1  | O2  | E2  |
|------|------|-----|-----|-----|-----|
| 0    | 0    | *G2 | *G1 | *G4 | *G3 |
| 1    | 1    | *G3 | *G4 | *G1 | *G2 |
| 0    | 1    | *G1 | *G2 | *G3 | *G4 |
| 1    | 0    | *G4 | *G3 | *G2 | *G1 |

FIG. 10 shows the signal waveforms at various parts of the circuits shown in FIGS. 8 and 9. FIG. 10(A) through (D) respectively show the gate signals *G1 through *G4 which are supplied to the multiplexers 31 through 34. FIG. 10(E) shows the servo signal CRAMP supplied to the peak hold circuits 91 through 94. FIG. 10(F) and (G) respectively show the peak values O1 and E1 output from the peak hold circuits 91 and 92, and FIG. 10(H) and (I) respectively show the peak values O2 and E2 output from the peak hold circuits 93 and 94. In addition, FIG. 10(J) and 10(K) respectively show the position signals POSN and POSQ which are selectively output from the position signal selection circuit 97 as the output of the position signal demodulating circuit 75.

Next, a description will be given of a control during a seek operation made in a forward direction, in which the position signal POSN changes from the positive polarity to the negative polarity in a state where the magnetic head 73 is on-track, by referring to FIG. 11.

Figure 11:
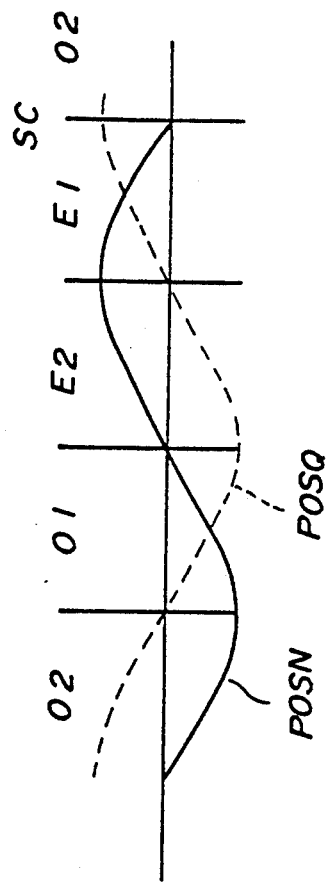
FIG. 11 is a diagram for explaining a control during a seek operation made in a forward direction.

In FIG. 11, the position signal POSN is indicated by a solid line, and the position signal POSQ is indicated by a dotted line. When a stop cylinder is denoted by a point SC and the cylinder addresses CAR0 and CAR1 are set to [0, 0], the position of the magnetic head 73 is controlled by converting the gate signals *G1m *G2, *G3 and *G4 into the gate signals *NG1, *NG2, *NG3 and *NG4, respectively.

Because the gate signals are selected so that the on-track is achieved using only the position signal POSN for the even cylinder, for example, it is possible to substantially eliminate the difference in peak detection sensitivities of the peak hold circuits.

Figure 12:
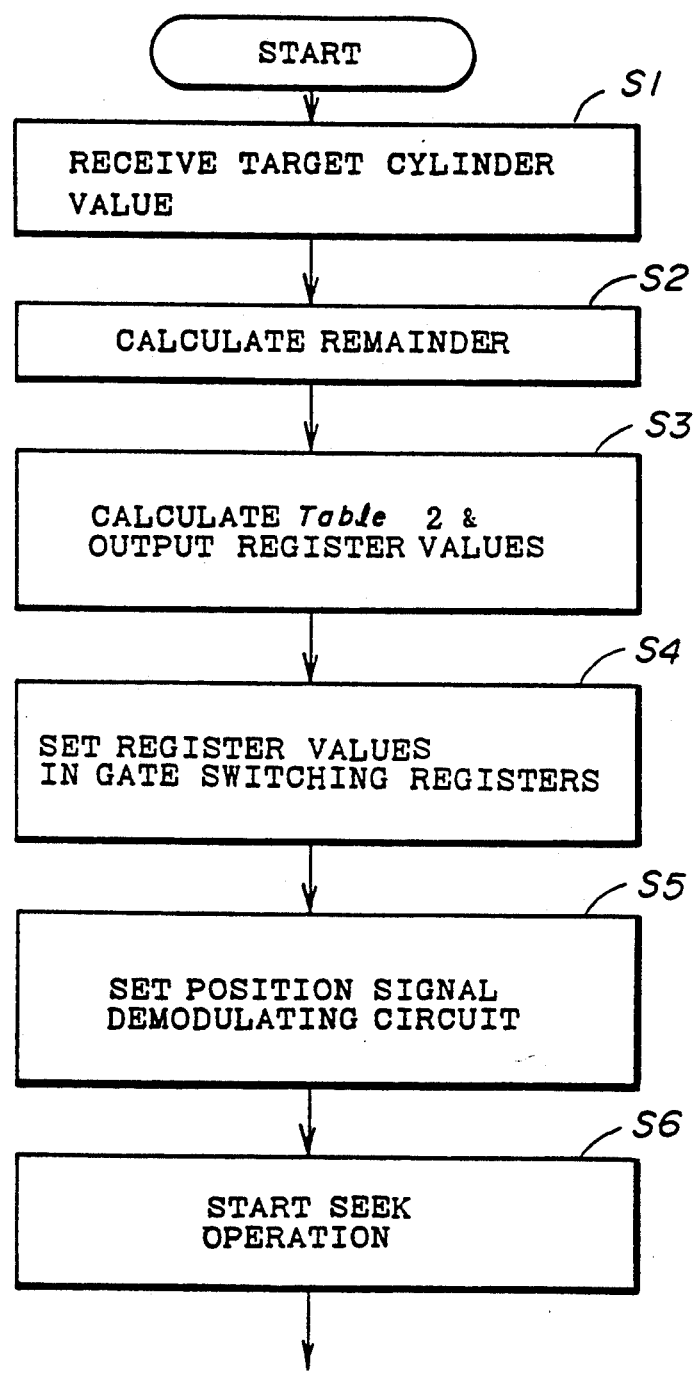
FIG. 12 is a flow chart for explaining a control process which is carried out before a start of a seek operation.

FIG. 12 shows a flow chart for explaining a control process which is carried out by the control circuit 71 shown in FIG. 6 before a start of a seek operation.

When the control circuit 71 receives a target cylinder value in a step S1, a step S2 calculates a remainder which is obtained when the target cylinder value is divided by four. A step S3 calculates the Table 2 from the obtained remainder, and outputs register values for switching the gates. A step S4 sets the register values in the gate switching registers within the control circuit 71, and the position signals POSN and POSQ are switched. A step S5 sets the position signal demodulating circuit 75 depending on the switching of the gates, and a step S6 starts the seek operation.

Figure 13:
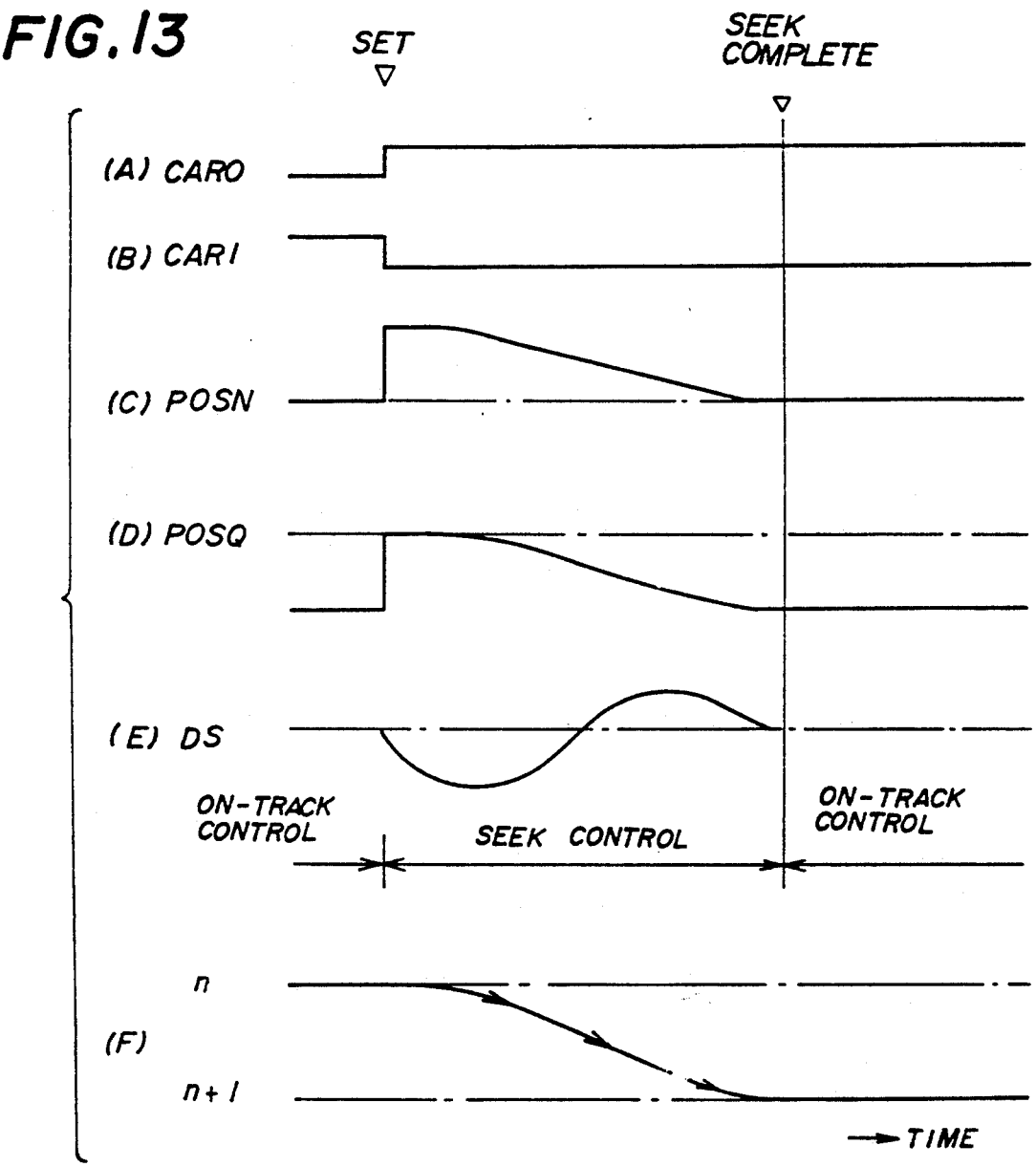
FIG. 13 is a time chart for explaining the control process shown in FIG. 12.

FIG. 13 is a time chart for explaining the control process of FIG. 12. In FIG. 13, "SET" indicates the timing with which the registers values are set in the gate switching registers within the control circuit 71, and "SEEK COMPLETE" indicates the timing with which the seek is completed. FIG. 13(A) and (B) respectively show the cylinder addresses CAR0 and CAR1 supplied from the gate switching registers of the control circuit 71 to the switching circuit 21. FIG. 13(C) and (D) respectively show the position signals POSN and POSQ output from the position signal demodulating circuit 75. FIG. 13(E) shows the driving signal DS which is supplied from the servo circuit 77 to the voice coil motor 78. In addition, FIG. 13(F) shows the seek locus of the magnetic head 73 from the cylinder (or track) n to the cylinder (or track) n+1.

Figure 4:
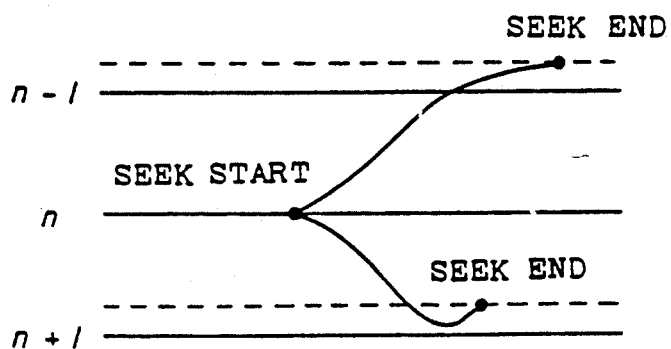
FIG. 4 is a diagram for explaining a seek locus of the magnetic head when the peak hold circuits have an offset.
Figure 14:
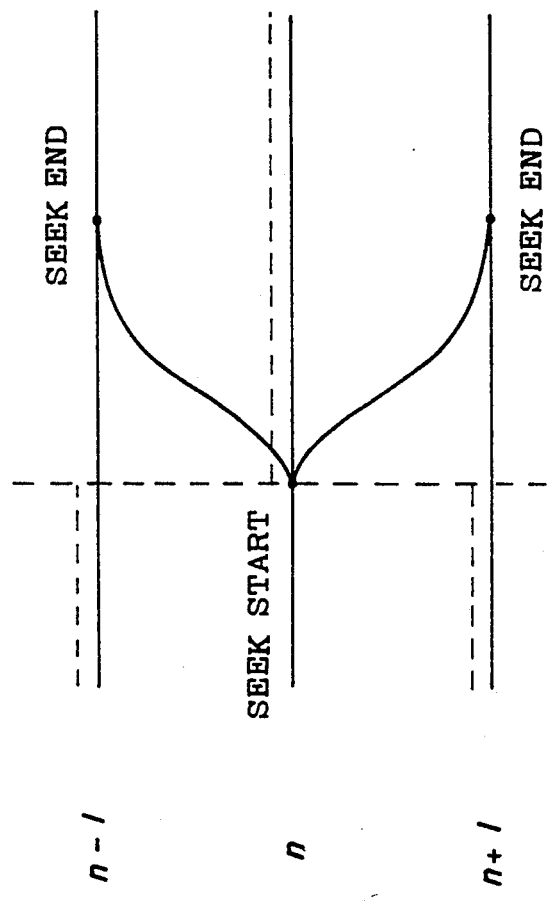
FIG. 14 is a diagram for explaining a seek locus of the magnetic head in the embodiment.

FIG. 14 shows a seek locus of the magnetic head 73 for a case where the peak hold circuits 93 and 94 which are used for generating the position signal POSQ have a certain offset. In this case, before the seek operation starts, the electrical center of the cylinder shifts as indicated by a dotted line from the actual center of the cylinder on the magnetic disk 72 due to the difference in the peak value detection sensitivities of the peak hold circuits 93 and 94 when compared to those of the peak hold circuits 91 and 92, where the actual center of the cylinder is indicated by a solid line. However, because the same position signal for the odd and even cylinders of the magnetic disk 72, no under shoot occurs when the seek operation is made from the cylinder n to the cylinder n-1, and no overshoot occurs when the seek operation is made from the cylinder n to the cylinder n+1. Therefore, the problems described above in conjunction with FIG. 4 is eliminated.

Figure 15:
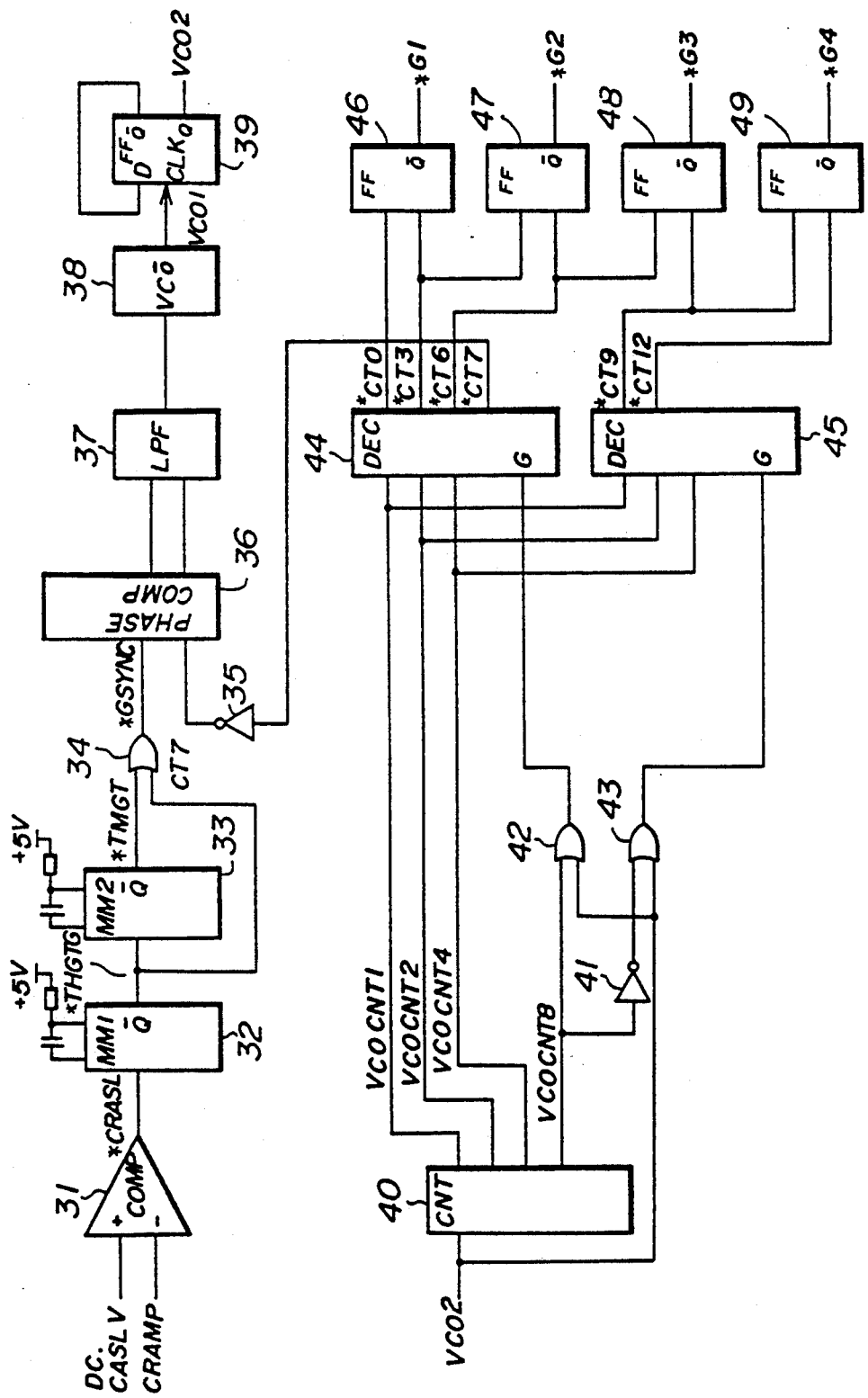
FIG. 15 is a system block diagram showing an embodiment of a synchronizing signal demodulating circuit and a PLL counter shown in FIG. 6.

Next, a description will be given of the synchronizing signal demodulating circuit 76 and the PLL counter 79 shown in FIG. 6 which generates the gate signals *G1 through *G4 described above. FIG. 15 shows an embodiment of the synchronizing signal demodulating circuit 76 and the PLL counter 79, and FIG. 16 shows signals waveforms at various parts of the circuit shown in FIG. 15.

In FIG. 15, a comparator 31 receives a D.C. reference voltage CASLV and the servo signal CRAMP shown in FIG. 16(A) from the servo amplifier 74. An output signal *CRASL of the comparator 31 shown in FIG. 16(B) is supplied to a monostable multivibrator 32 and is formed into a signal *TMGTG shown in FIG. 16(C). The signal *TMGTG is supplied to a monostable multivibrator 33 on one hand and is supplied to an OR circuit 34 on the other. The OR circuit 34 also receives an output signal *TMGT of the monostable multivibrator 33 shown in FIG. 16(D). Hence, the OR circuit 34 supplies a signal *GSYNC shown in FIG. 16(E) to a phase comparator 36. This phase comparator 36 receives a signal CT7 shown in FIG. 16(F) via an inverter 35. An output signal of the phase comparator 36 is supplied to a voltage controlled oscillator (VCO) 38 via a lowpass filter 37, and an output signal VCO1 of the VCO 38 is supplied to a clock terminal CLK of a flip-flop 39. An output terminal Q of the flip-flop 39 is fed back to an input terminal D of this flip-flop 39, and an output signal VCO2 shown in FIG. 16(G) is output from an output terminal Q of this flip-flop 39.

The output signal VCO2 of the flip-flop 39 is supplied to a control circuit 40, and to OR circuits 42 and 43. The control circuit 40 generates signals VCOCNT1, VCOCNT2, VCOCNT4 and VCOCNT8 in response to the signal VCO2. The signals VCOCNT1, VCOCNT2 and VCOCNT4 are supplied to decoders 44 and 45. On the other hand, the signal VCOCNT8 is supplied to the OR circuit 42 directly, and to the OR circuit 43 indirectly via an inverter 41. Output signals of the OR circuits 42 and 43 are respectively supplied to the decoders 44 and 45.

The decoder 44 generates signals *CT0, *CT3, *CT6 and *CT7, while the decoder 45 generates signals *CT9 and *CT12. FIG. 16(H), (I), (J), (K) and (L) respectively show the signals *CT0, *CT3, *CT6, *CT9 and *CT12. The signal *CT0 is supplied to a flip-flop 46. The signal *CT3 is supplied to flip-flops 46 and 47. The signal *CT6 is supplied to flip-flops 47 and 48. The signal *CT7 is inverted by the inverter 35 which supplies the signal CT7 to the phase comparator 36. The signal *CT9 is supplied to flip-flops 48 and 49. The signal *CT12 is supplied to the flip-flop 49. As a result, the gate signals *G1 through *G4 respectively shown in FIG. 16(M) through (P) are output from the flip-flops 46 through 49. These gate signals *G1 through *G4 are supplied to the switching circuit 21 shown in FIG. 6.

Further, the present invention is not limited to these embodiments, but various variations and modifications may be made without departing from the scope of the present invention.

What is claimed is:

1. A method of positioning a magnetic head on a target cylinder of a magnetic disk using a position signal derived from a servo signal which is read from a magnetic disk using a magnetic head, said servo signal including at least first and second servo signal components on even cylinders of the magnetic disk and including at least third and fourth servo signal components on odd cylinders of the magnetic disk, said position signal being used for moving the magnetic head to a desired cylinder, said method comprising the steps of:
    (a) obtaining a first position signal for positioning the magnetic head to an odd cylinder on the magnetic disk based on a difference between peak values of the first and second servo signal components and a second position signal for positioning the magnetic head to an even cylinder on the magnetic disk based on a difference between peak values of the third and fourth servo signal components; and
    (b) using only one of the first and second position signals to position the magnetic head to the target cylinder depending on a cylinder address of the target cylinder.

2. The method as claimed in claim 1, wherein said step (a) uses same peak hold circuits for obtaining the peak values of the first and second servo signal components and the peak values of the third and fourth servo signal components.

3. The method as claimed in claim 1, wherein said step (b) positions the magnetic head to the target cylinder during a seek operation.

4. The method as claimed in claim 1, which further comprises the steps of:
    (c) obtaining first gate signals corresponding to the first through fourth servo signal components based on the servo signal which is read from the magnetic disk by the magnetic head; and
    (d) converting the first gate signals into second gate signals in response to the cylinder address, said step (a) obtaining the first through fourth servo signal components in response to the second gate signals.

5. A head positioning system for positioning a magnetic head on a target cylinder of a magnetic disk using a position signal derived from a servo signal which is read from a magnetic disk using a magnetic head, said servo signal including at least first and second servo signal components on even cylinders of the magnetic disk and including at least third and fourth servo signal components on odd cylinders of the magnetic disk, said position signal being used for moving the magnetic head to a desired cylinder, said head positioning system comprising:
    position signal generating means, including peak hold circuits, for obtaining a first position signal odd cylinder on the magnetic disk based on a difference between peak values of the first and second servo signal components and a second position signal which is used for positioning the magnetic head to an even cylinder on the magnetic disk based on a difference between peak values of the third and fourth servo signal components; and
    servo means which uses only one of the first and second position signals to position the magnetic head to the target cylinder depending on a cylinder address of the target cylinder.

6. The head positioning system as claimed in claim 5, wherein said position signal generating means uses the same peak hold circuits for obtaining the peak values of the first and second servo signal components and the peak values of the third and fourth servo signal components.

7. The head positioning system as claimed in claim 5, wherein said servo means positions the magnetic head to the target cylinder during a seek operation.

8. The head positioning system as claimed in claim 5, which further comprises:
    first means for obtaining first gate signals corresponding to the first through fourth servo signal components based on the servo signal which is read from the magnetic disk by the magnetic head; and
    second means for converting the first gate signals into second gate signal in response to the cylinder address,
    said position signal generating means obtaining the first through fourth servo signal components in response to the second gate signals.

9. The head positioning system as claimed in claim 8, wherein the relationship of the following table

| CAR0 | CAR1 | O1  | E1  | O2  | E2  |
|------|------|-----|-----|-----|-----|
| 0    | 0    | *G2 | *G1 | *G4 | *G3 |
| 1    | 1    | *G3 | *G4 | *G1 | *G2 |
| 0    | 1    | *G1 | *G2 | *G3 | *G4 |
| 1    | 0    | *G4 | *G3 | *G2 | *G1 | stands between the first and second gate signals, where CAR0 and CAR2 denote lower two bits of the cylinder address, *G1 through *G4 respectively denote the first gage signals corresponding to the first through fourth servo signal components, 01 denotes a peak value held by a first of the peak hold circuits, E1 denotes a peak value held by a second of the peak hold circuits, 02 denotes a peak value held by a third of the peak hold circuits, and E1 denotes a peak value held by a fourth of the peak hold circuits.

* * * * *

UNITED STATES PATENT AND TRADEMARK OFFICE
CERTIFICATE OF CORRECTION

PATENT NO. : 5,311,379
DATED : May 10, 1994
INVENTOR(S) : Tohru SHINOHARA et al.

It is certified that error appears in the above-indentified patent and that said Letters Patent is hereby corrected as shown below:

Column 10, Line 16, Claim 5, after "signal" insert --which is used for positioning the magnetic head to an--.

Column 10, Line 66, Claim 9, change "E1" to --E2--.

Signed and Sealed this

Sixteenth Day of August, 1994

Attest:

BRUCE LEHMAN

*Attesting Officer*    *Commissioner of Patents and Trademarks*